US010447511B2

(12) United States Patent
Xie et al.

(10) Patent No.: US 10,447,511 B2
(45) Date of Patent: *Oct. 15, 2019

(54) STABLE MODULATION INDEX CALIBRATION AND DYNAMIC CONTROL

(71) Applicant: Cypress Semiconductor Corporation, San Jose, CA (US)

(72) Inventors: Kai Xie, San Jose, CA (US); Yan Li, Morganville, NJ (US); Hongwei Kong, Basking Ridge, NJ (US); Jie Lai, Belle Mead, NJ (US); Kamesh Medapalli, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/122,067

(22) Filed: Sep. 5, 2018

(65) Prior Publication Data
US 2019/0104000 A1 Apr. 4, 2019

Related U.S. Application Data

(63) Continuation of application No. 15/849,491, filed on Dec. 20, 2017, now Pat. No. 10,079,699.
(Continued)

(51) Int. Cl.
*H04L 25/03* (2006.01)
*H04L 27/12* (2006.01)
(Continued)

(52) U.S. Cl.
CPC .. *H04L 25/03834* (2013.01); *H04L 25/03057* (2013.01); *H04L 27/10* (2013.01);
(Continued)

(58) Field of Classification Search
CPC ......... H04L 25/03057; H04L 25/03834; H04L 25/12; H04L 25/122; H04L 25/144;
(Continued)

(56) References Cited

U.S. PATENT DOCUMENTS 9,276,704 B1 3/2016 Ilitzky et al.
9,306,781 B2 4/2016 Shin et al.
(Continued)

FOREIGN PATENT DOCUMENTS

CN 202906963 U 4/2013
WO 2015063622 A1 5/2015

OTHER PUBLICATIONS

"MT885213 Bluetooth Test Set—Operation Manual," Anritsu Company, Feb. 2017, pp. 1-239; 239 pages.
(Continued)

*Primary Examiner* — David B Lugo

(57) ABSTRACT

Calibrating a Gaussian frequency-shift keying modulation index includes generating a training sequence of bits, shaping a pulse from the training sequence according to an initial modulation index, and converting the shaped signal to a transmission signal. The transmission signal is then either looped through a radio frequency core or processed by frequency deviation estimation hardware to determine a frequency deviation. The frequency deviation is converted to a new modulation index, and potentially a ratio between a target modulation index and a measured modulation index as a scaling factor. The process is then iteratively repeated until a threshold frequency deviation is achieved.

18 Claims, 5 Drawing Sheets

Related U.S. Application Data

(60) Provisional application No. 62/566,682, filed on Oct. 2, 2017.

(51) Int. Cl.
  *H04L 27/10* (2006.01)
  *H04L 27/144* (2006.01)
  *H04L 27/00* (2006.01)

(52) U.S. Cl.
  CPC .......... *H04L 27/122* (2013.01); *H04L 27/144* (2013.01); *H04L 2027/0055* (2013.01); *H04L 2027/0065* (2013.01); *H04L 2027/0093* (2013.01)

(58) Field of Classification Search
  CPC ..... H04L 27/12; H04L 27/122; H04L 27/144; H04L 27/10; H04L 2027/0055; H04L 2027/0065; H04L 2027/0093
  See application file for complete search history.

(56) References Cited

U.S. PATENT DOCUMENTS

| | | | |
|---|---|---|---|
| 9,408,147 B2 | 8/2016 | Polo et al. | |
| 9,571,314 B1* | 2/2017 | Yang | H04L 27/14 |
| 9,634,877 B2 | 4/2017 | Lafuente et al. | |
| 9,699,011 B1 | 7/2017 | Sethi et al. | |
| 9,712,951 B2 | 7/2017 | Kirshenberg et al. | |
| 9,722,845 B2 | 8/2017 | Lu et al. | |
| 10,079,699 B1 | 9/2018 | Li et al. | |
| 2010/0194486 A1 | 8/2010 | Lang | |
| 2011/0090944 A1 | 4/2011 | Kim et al. | |
| 2016/0178723 A1 | 6/2016 | Jiao et al. | |
| 2017/0005784 A1 | 1/2017 | Miura | |
| 2017/0195152 A1 | 7/2017 | Chu et al. | |
| 2017/0238328 A1 | 8/2017 | Luong et al. | |
| 2017/0317735 A1* | 11/2017 | De Carvalho | H04B 7/06 |

OTHER PUBLICATIONS

USPTO Non-Final Rejection for U.S. Appl. No. 15/849,491 dated Feb. 16, 2018; 8 pages.

USPTO Notice of Allowance for U.S. Appl. No. 15/849,491 dated May 21, 2018; 5 pages.

Wagner, R.,"Bluetooth Low Energy (V5.0) HF-Test für Internet of Things Anwendungen Application Note (Original)," Rohde and Schwarz, Jun. 2017, pp. 1-141; 141 pages.

Wagner, R.,"Bluetooth Low Energy (V5.0) HF-Test für Internet of Things Anwendungen Application Note (Translated)," Rohde and Schwarz, Jun. 2017, pp. 1-3; 3 pages.

China National Intellectual Property Administration (CNIPA) Office Action for International Application No. 2018109802595 (CN17036CN) dated Jul. 31, 2019, 5 pages.

* cited by examiner

STABLE MODULATION INDEX CALIBRATION AND DYNAMIC CONTROL

PRIORITY

The present application is a continuation application of U.S. Non-Provisional application Ser. No. 15/849,491 filed Dec. 20, 2017, which claims the priority and benefit under 35 U.S.C. § 119(e) of U.S. Provisional App. No. 62/566,682, filed Oct. 2, 2017, all of which are incorporated by reference herein in their entirety.

FIELD OF THE INVENTION

The present disclosure generally relates to the field of digital wireless communication, and more particularly to Bluetooth low energy devices.

BACKGROUND

Certain wireless communication protocols that use Gaussian frequency-shift keying (GFSK), such as Bluetooth, Digital Enhanced Cordless Telecommunications, ZigBee, Z-Wave, etc., utilize a modulation index that controls the extent of frequency shifting or deviation which defines encoded bits; the modulation index value is nominally 0.5. Existing protocol standards, such as Bluetooth 4.2, have accuracy requirements that can be satisfied with a modulation index ranging from 0.45 to 0.55±a 10% margin of error. Error in the modulation index is mainly due to imperfections in the analog/radio frequency conversion process. Future protocol standards, such as Bluetooth 5 and higher, will require a modulation index ranging from 0.495 to 0.505±a 1% margin of error. That requirement will be difficult to achieve with current Bluetooth low energy devices, and more stringent requirements for radio frequency parts to remove variability may be cost prohibitive.

Consequently, it would be advantageous if an apparatus existed that is suitable for establishing and constraining a modulation index within a narrower range than current possible.

SUMMARY

In one aspect, embodiments of the inventive concepts disclosed herein are directed to a method for calibrating a Gaussian frequency-shift keying modulation index. A modem generates a training sequence of bits and shapes a pulse from the training sequence according to an initial modulation index. The training sequence is converted to a transmission signal, and then either looped through a radio frequency core or processed by frequency deviation estimation hardware to determine a frequency deviation. The frequency deviation is converted to a new modulation index, and potentially a ratio between a target modulation index and a measured modulation index as a scaling factor. The process is then iteratively repeated until a threshold frequency deviation is achieved.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Reference will now be made in detail to the subject matter disclosed, which is illustrated in the accompanying drawings.

Figure 1:
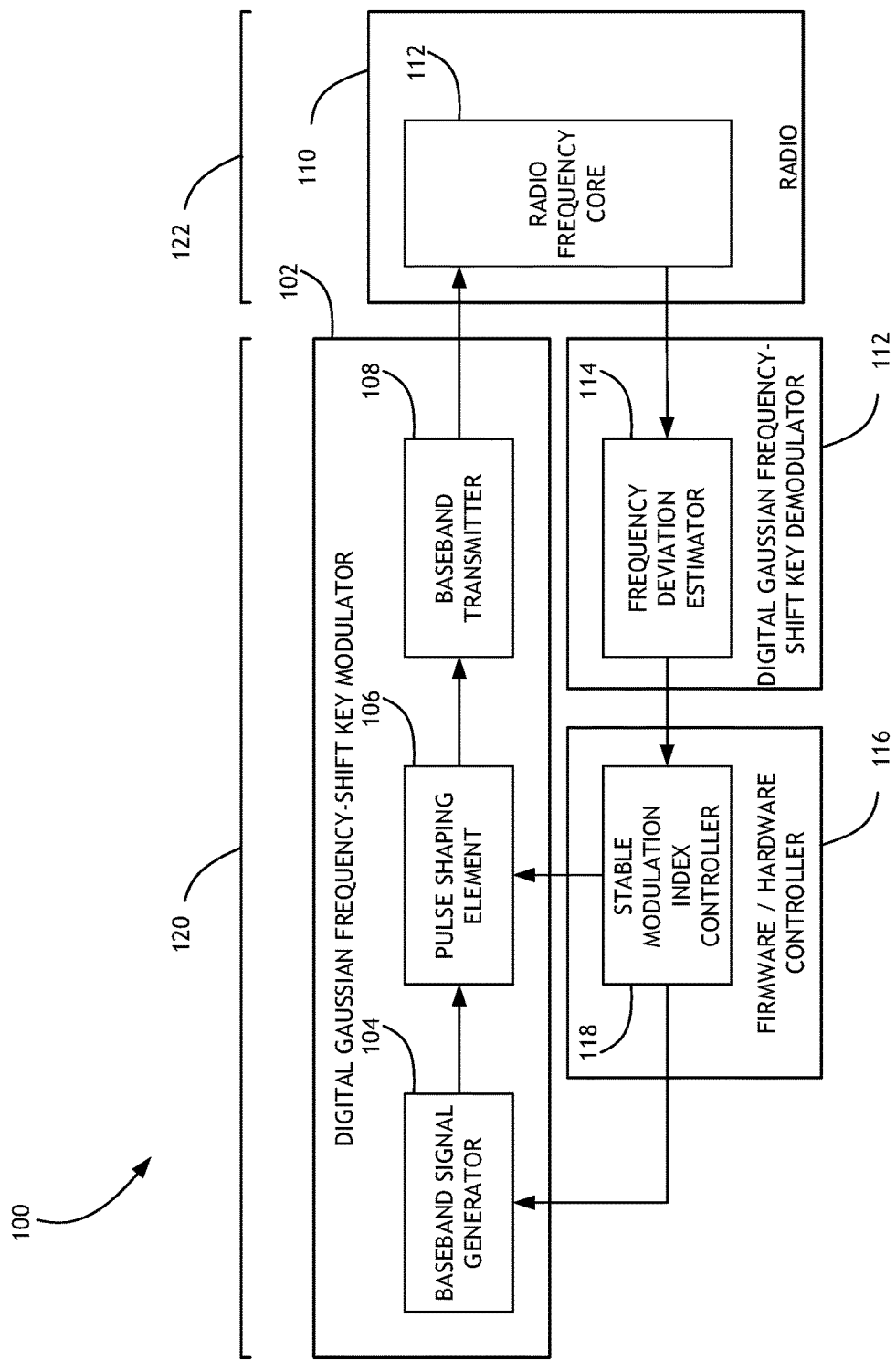
FIG. 1 shows a block diagram of a closed-loop calibration system according to one exemplary embodiment of the inventive concepts disclosed herein.

Referring to FIG. 1, a block diagram of a closed-loop calibration system 100 according to one exemplary embodiment of the inventive concepts disclosed herein is shown. The system 100 comprises a digital Gaussian frequency-shift keying modulator 102 that produces a digital signal according to a modulation index using a baseband signal generator 104 that that generates a digital training sequence. In at least one embodiment, the baseband signal generator 104 comprises a modem PHY layer element; alternatively, the training sequence may be generated from the Bluetooth MAC layer. The digital training sequence is sent to a pulse shaping element 106 that manipulates the training sequence according to an initial modulation index (or by an iteratively refined modulation index as more fully described herein). The shaped training signal is sent to a baseband transmitter 108 that performs up-sampling, rate conversion, and pre-distortion; and converts the pulse shaped training signal from the clock rate in the digital domain 120 to the clock rate in the analog domain 122. The baseband transmitter 108 then transmits the shaped training signal to an analog radio 110.

The analog radio 110 includes a radio frequency core 112 that receives the transmitted shaped training signal and sends or loops back the received shaped training signal, now in analog form, to a digital Gaussian frequency-shift key demodulator 112. A frequency deviation estimator 114 in the digital Gaussian frequency-shift key demodulator 112 determines a projected deviation between the received shaped training signal and the known training signal, and passes the determined deviation to a firmware or hardware controller 116 with a stable modulation index estimator and controller 118 that iteratively adjusts the modulation index used by the pulse shaping element 106 based on the determined deviation. The modulation index is equal to double the Gaussian frequency-shift keying frequency deviation per symbol rate. For Bluetooth, the symbol rate can be either 1 MHz or 2 MHz. Normal transmission requires frequency deviation between 225 kHz and 275 kHz; stable transmission requires frequency deviation between 247.5 kHz and 252.5 kHz.

In at least one embodiment, a ratio between the target modulation index and the measured modulation index as defined by the frequency deviation comprises a scaling factor to tune the pulse shaping element 106. In at least one embodiment, the pulse shaping element 106 scales the training signal by the calculated ratio. Scaling can be applied before or after pulse shaping.

In at least one embodiment, the system 100 iteratively calculates a new modulation index, applies the new modulation index to a training signal, and recalculates a projected deviation until the deviation is within a desired threshold.

In at least one embodiment, a series of projected deviations and corresponding modulation indexes are independently determined and combined, such as through a weighted average. In such an operation, data points in the series may be filtered, for example to remove outliers beyond a predetermined number of standard deviations.

The stable modulation index estimator and controller 118 controls the baseband signal generator 104 to produce a desired digital bit training sequence. Bit sequences comprising single bits produce single frequency training signals. The training sequence could be alternating all-off and all-on sequences, e.g., 0000111100001111 . . . . Modulation index calibration performance is depending on the accuracy of the stable modulation index estimator controller 118. Estimation accuracy can be improved by sending longer training sequences and averaging over multiple iterations. The stable modulation index estimator and controller 118 also calculates the scaling factor for the pulse shaping element 106 based on the target and the measured modulation index or frequency deviation, and programs the scaling factor into the pulse shaping element 106.

Figure 2:
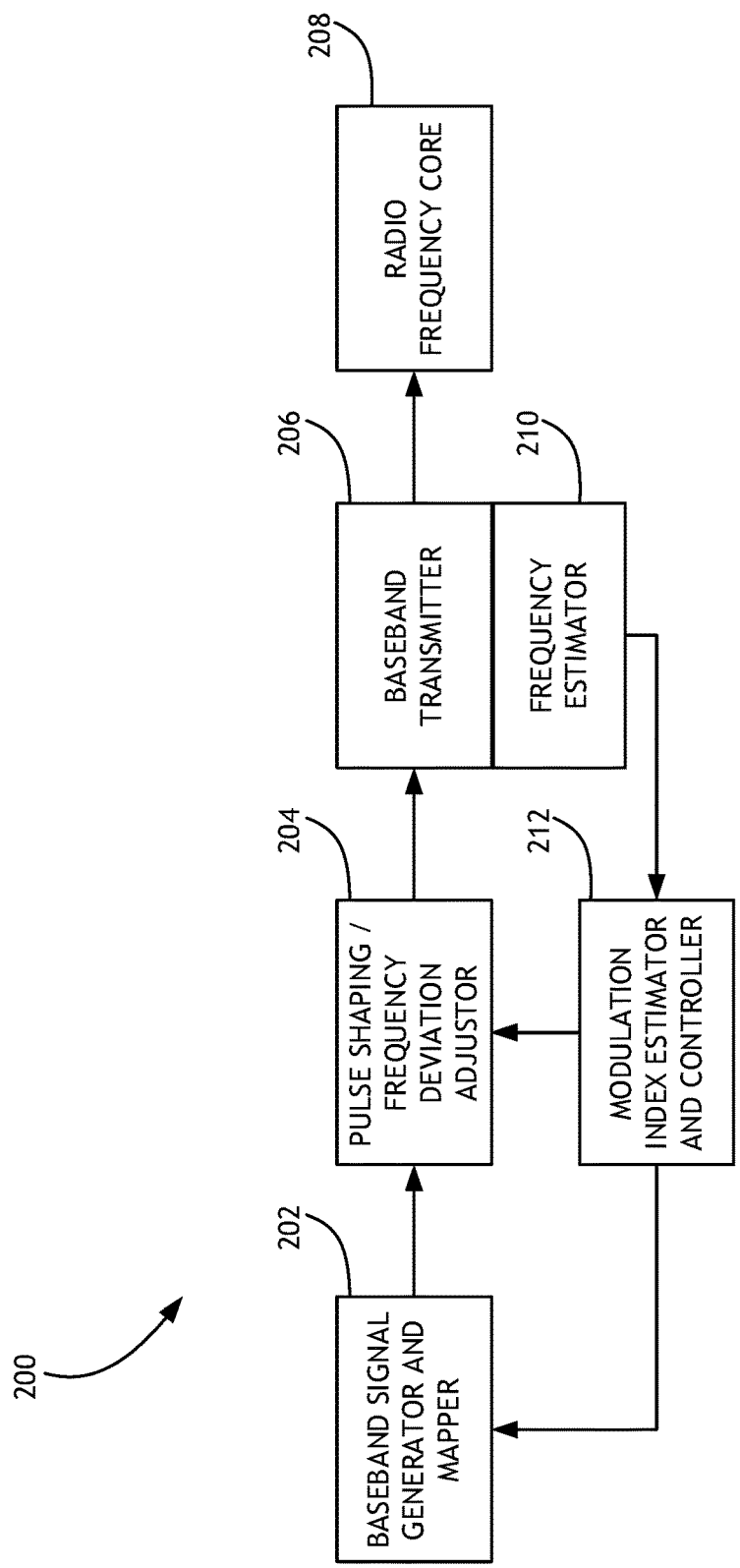
FIG. 2 shows a block diagram of an open-loop calibration system according to one exemplary embodiment of the inventive concepts disclosed herein.

Referring to FIG. 2, a block diagram of an open-loop calibration system 200 according to one exemplary embodiment of the inventive concepts disclosed herein is shown. In the open-loop embodiment, the system 200 includes a baseband signal generator and mapper 202 that generates a digital training sequence which is then sent to a pulse shaping/frequency adjusting element 204 that manipulates the training sequence according to an initial modulation index and later by an iteratively refined modulation index. The shaped training signal is sent to a baseband transmitter 208 that performs up-sampling, rate conversion, and pre-distortion; and converts the pulse shaped training signal from the digital clock rate to the analog clock rate. The baseband transmitter 208 includes a frequency estimator 210 that directly determines a projected deviation between the signal converted for transmission and the known training signal and transfers the determined deviation to a modulation index estimator and controller 212 without loop-back through a radio frequency core 208 using zero-crossing or other single-tone frequency estimation. The modulation index estimator and controller 212 iteratively adjusts the modulation index used by the pulse shaping element/frequency adjusting element 204 based on the determined deviation.

In at least one embodiment, the modulation index estimator and controller 212 calculates an average frequency deviation for all training bit sequences from the frequency estimator 210 and estimate a modulation index. Based on the calculated modulation index and known training signal, the modulation index estimator and controller 212 calculates a scaling factor, programs the pulse shaping/frequency adjusting element 204 with the scaled modulation index, and controls the signal generated by the baseband signal generator and mapper 202 to produce a desired training sequence in a subsequent calibration step. In at least one embodiment, the modulation index estimator and controller 212 may generate training sequences of increasing length in successive calibration operations to produce increasingly accurate modulation indexes.

A closed-loop system 100 or open-loop calibration system 200 may be selected based on performance considerations and available resources. In at least one embodiment, modulation index calibration is performed periodically to correct drift over time. Further, calibration may be performed when significant temperature change is detected as temperature is an important factor to the modulation index. Calibration is needed since each device has its own modulation index characteristics.

Figure 3:
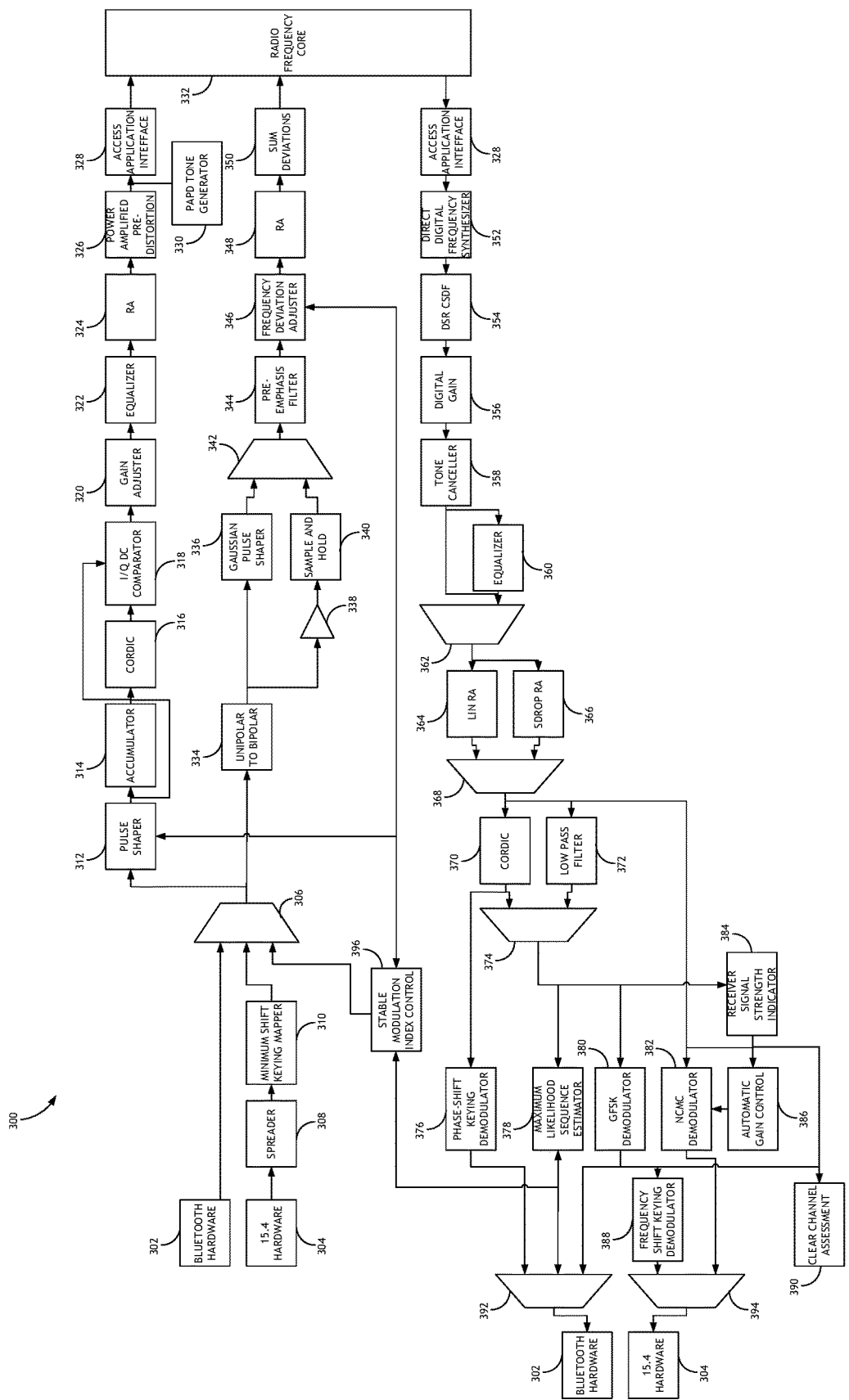
FIG. 3 shows a block diagram of a circuit according to embodiments of the inventive concepts disclosed herein.

Referring to FIG. 3, a block diagram of a circuit 300 according to embodiments of the inventive concepts disclosed herein is shown. The circuit 300 includes elements and data pathways relevant to multiple protocol types. Hardware or firmware machines 302. 304 such as a Bluetooth hardware device 302 or an IEEE 802.15.4 hardware device 304. Some hardware devices 302, 304 may be directly connected to a multiplexer 306 configured to select signals for modulation along one or more modulation pathways such as an in-phase/quadrature (I/Q) modulation pathway. Alternatively, or in addition, Hardware devices 302, 304 may be connected to the multiplexer 306 via a spreader 308 for spreading the modulated pulse positions, such as via a pseudorandom sequence, and a minimum shift keying mapper 310 for mapping signal pulses to a Gaussian frequency spectrum. In the I/Q modulation pathway, the multiplexer 306 sends the signal to be modulated to a pulse shaper 312 for constraining the spectrum of the modulated signal. In one embodiment, an accumulator 314 temporarily stores the signal from the pulse shaper 312; in another embodiment, the signal from the pulse shaper 312 may bypass the accumulator 314 for a coordinate rotation digital computer (CORDIC) 316. Alternatively, or in addition, the signal from the accumulator 314 may bypass the CORDIC 316 for an I/Q comparator 318. A gain adjuster 320 that multiplies frequency shifted pulses by a predetermined or programmable gain value receives the signal from the I/Q comparator 318 and sends the gain adjusted signal to an equalizer 322 for balancing signal properties and the operational mode of the signal. The equalized signal is processed through a radio attenuator 324 to a power amplified pre-distortion element 326. The signal from the power amplified pre-distortion element 326 and from a power amplified pre-distortion generator 330 are sent to a radio frequency core 332 via an access application interface 328.

In at least one embodiment, an alternate, direct modulation pathway includes a unipolar to bipolar converter 334 that receives a signal from the multiplexer 306. The converted signal may travel a bifurcated path to a Gaussian pulse shaper 336 and an op-amp 338 to a sample and hold element 340. Both the Gaussian pulse shaper 336 and the sample and hold element 340 are connected through a multiplexer 342 to a pre-emphasis filter 344 to emphasize desirable frequencies within the signal. The frequency pulses of the filtered signal are altered via a frequency deviation adjuster 346 based on a modulation index, either by an initial modulation index value or an updated modulation index value as described herein. The modulated signal is processed through a radio attenuator 348, frequency deviations (corresponding to encoded bits) are compiled by a summation element 350 and the signal transferred to the radio frequency core 332.

In a demodulation path, a signal from the radio frequency core 332 is received by the access application interface 328 and a direct digital frequency synthesizer 352 that produces a digital signal based on the signal from the radio frequency core 332. The synthesized signal with frequency deviations corresponding to decoded bits is processed via a cyclo-static data flow dynamic source router 354. The gain of the signal is adjusted via a digital gain element 356, and tones are cancelled via a tone canceller 358; the tone cancelled signal may travel a bifurcated path to a first demodulation multiplexer 362, both directly and through and equalizer 360. A signal from the first demodulation multiplexer 362 is received by a local interconnect network radio attenuator 364 and a silent drop radio attenuator 366 to mitigate overloading of a service network. A second demodulation multiplexer 368 sends a resulting signal to both a CORDIC 370, a low pass filter 372, and network centric management communications demodulator 382. The signal from the CORDIC 370 is sent to a phase-shift keying demodulator 380. Signals from the CORDIC 370 and low pass filter 372 are also sent to a third demodulation multiplexer 374. The signal from the third demodulation multiplexer 374 is sent to a maximum likelihood sequence estimator 378, a Gaussian frequency-shift keying demodulator 380 and a receiver signal strength indicator 384, and thereby to a clear channel assessment element 390. The network centric management communications demodulator 382 also receives a gain control signal from an automatic gain control 386 derived from the receiver signal strength indicator 384. A fourth demodulation multiplexer 392 receives signals form the phase-shift keying demodulator 376, the maximum likelihood sequence estimator 378, and Gaussian frequency-shift keying demodulator 380. The signal selected from the fourth demodulation multiplexer 392 is delivered to at least one hardware or firmware machine 302, 304 such as the Bluetooth hardware device 302. A fifth demodulation multiplexer 394 receives signals from the Gaussian frequency-shift keying demodulator 380 via a frequency-shift keying demodulator 388 specific to a protocol being employed, such as a ZigBee demodulator; and a signal from the network centric management communications demodulator 382. The signal selected from the fifth demodulation multiplexer 394 is delivered to at least one hardware or firmware machine 302, 304 such as the IEEE 802.15.4 hardware device 304.

During demodulation, signals from the maximum likelihood sequence estimator 378 and the frequency deviation adjuster 346 are received by a state modulation index controller 396 configured to calculate or otherwise identify an updated modulation index value and deliver the updated modulation index value to various phase-shift and frequency-shift components. Furthermore, the stable modulation index controller 396 may also deliver the updated modulation index value to the multiplexer 306.

Depending on the Gaussian frequency-shift keying protocols employed, appropriate modulation and demodulation pathways are iteratively employed to derive a modulation index value suitable for producing pulse shapes sufficiently accurate, as more fully described herein.

Figure 4:
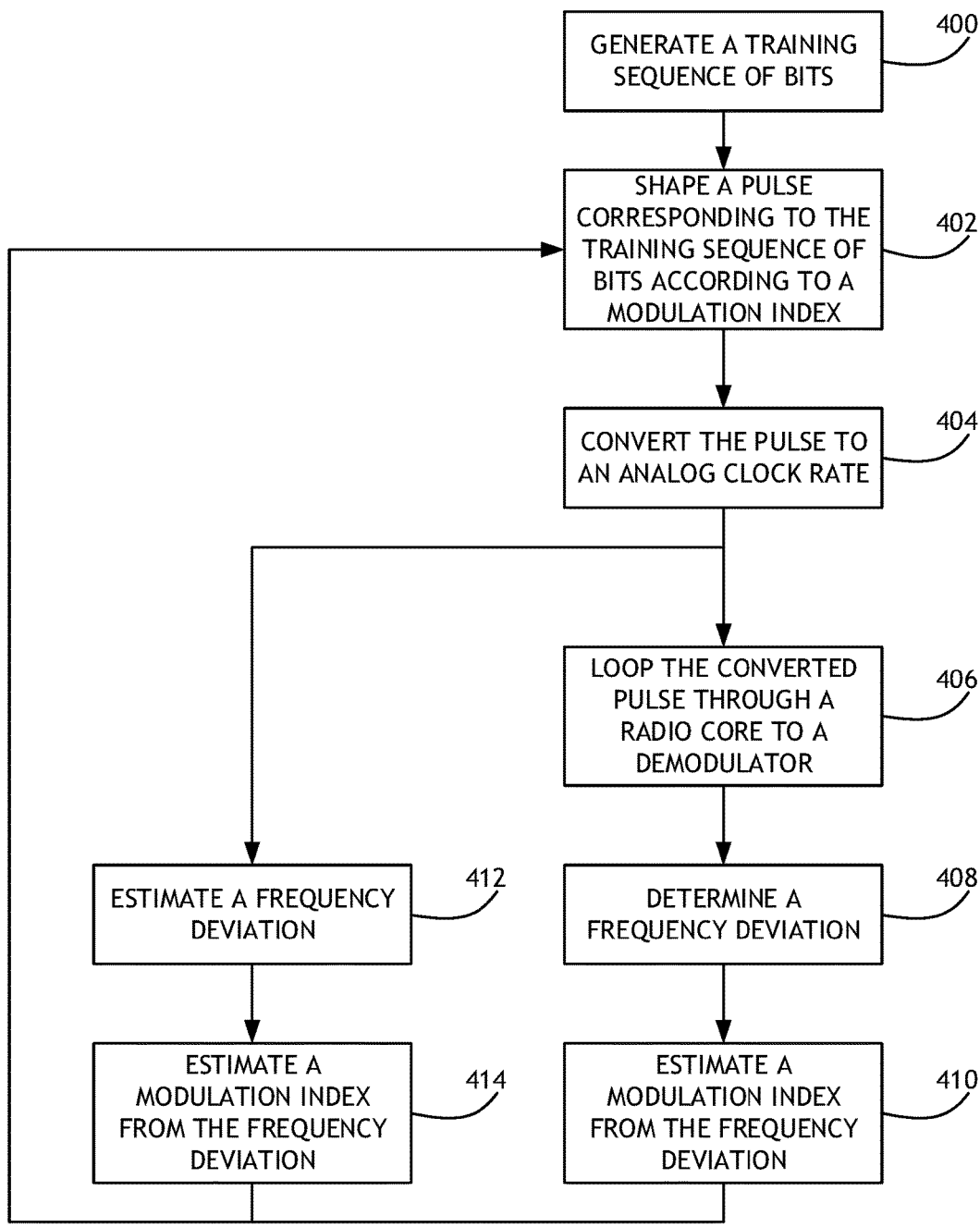
FIG. 4 shows a flowchart of a method for index calibrating according to one exemplary embodiment of the inventive concepts disclosed herein.

Referring to FIG. 4, a flowchart of a method for index calibrating according to one exemplary embodiment of the inventive concepts disclosed herein is shown. During power-up or recalibration, a Gaussian frequency-shift keying data communication system generates 400 a training signal. The training signal may be defined by a series of alternating uniform bit sequences, each bit sequence of some predefined length. The training signal is shaped 402 into a pulse according to a modulation index. The shaped signal is converted 404 from a digital clock rate to an analog clock rate suitable for transmission.

In at least one embodiment, the converted signal is looped 406 through a radio core to a demodulator. A frequency deviation estimator determines 408 an actual frequency deviation and a new modulation index is estimated 410 from the frequency deviation.

Alternatively, in at least one embodiment, a frequency deviation is estimated 412 mathematically without looping the converted signal through a radio. Frequency deviation may be estimated 412 based on an average frequency for a single tone signal from bit strings in the alternating bit sequences. In at least one embodiment, the frequency estimation can be done during baseband transmission or early stage of radio frequency transmission. Based on the estimated frequency deviation, a new modulation index is estimated 414.

In either case, the new estimated modulation index is used to shape 402 a new pulse, either from the predetermined training sequence or a new training sequence. Generating the pulse may include utilizing a ratio of the new modulation index and prior modulation index as a scaling factor on a frequency domain signal.

Such processes may be executed at start-up to initially calibrate a modulation index, or periodically to account for frequency drift. Furthermore, a system implementing embodiments of the inventive concepts disclosed herein may identify specific events or circumstances that may affect calibration; for example, temperature fluctuations or receiving aberrant signals.

Figure 5:
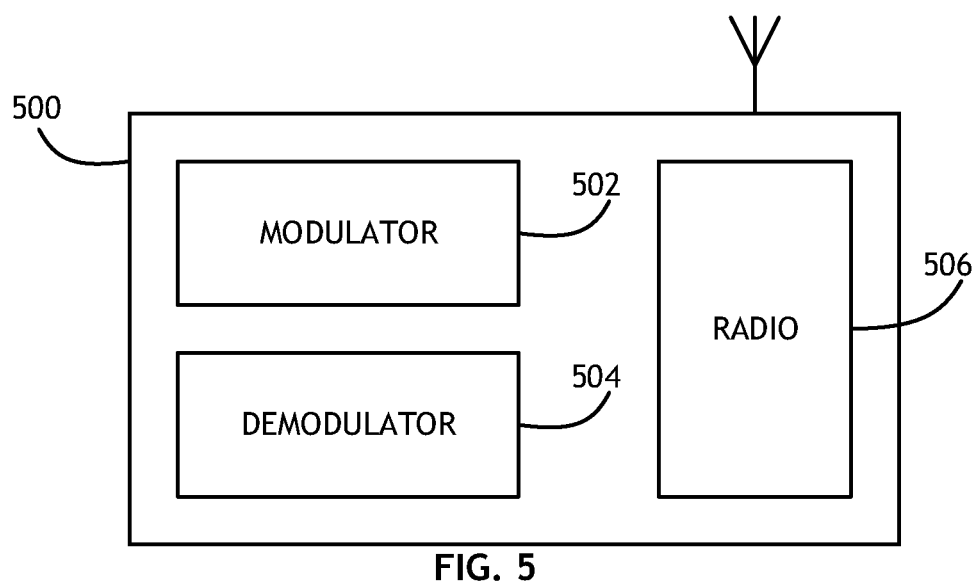
FIG. 5 shows a block diagram of a system incorporating an exemplary embodiment of the inventive concepts disclosed herein.

Referring to FIG. 5, a block diagram of a modem 500 incorporating an exemplary embodiment of the inventive concepts disclosed herein is shown. The modem 500 includes a Gaussian frequency-shift keying modulator 502 that generates a training signal based on a training sequence of bits and a modulation index, and converts the training signal for transmission.

In at least one embodiment, the converted training signal is demodulated by a Gaussian frequency-shift keying demodulator 504 and a frequency deviation is estimated. A new modulation index is derived from the frequency deviation estimate and a new training signal is generated based on the new modulation index.

In at least one embodiment, the converted training signal is looped back through a radio 508 to be demodulated by a Gaussian frequency-shift keying demodulator 504 so that an actual frequency deviation is identified. A new modulation index is derived from the frequency deviation and a new training signal is generated based on the new modulation index.

The process may continue until the frequency deviation is within an acceptable limit, or until a predetermined number of iterations have executed.

In some embodiments, the modem 500 is a system component in any of a plurality of data connected devices. For example, the modem 500 may be a component in a computer, smartphone, tablet, or any Bluetooth enabled device. Furthermore, any device utilizing a Gaussian frequency-shift keying protocol for wireless data communication may utilize embodiments of the inventive concepts disclosed herein.

Embodiments of the inventive concepts disclosed herein apply to any Gaussian frequency-shift keying modulated system with tight modulation index requirements for the transmission sub-system. Performance improvements are universal for all Gaussian frequency-shift keying modulated systems.

It is to be understood that the specific order or hierarchy of steps in the processes disclosed is but one example. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the systems and methods disclosed herein and many of their attendant advantages will be understood by the foregoing description, and it will be apparent that various changes may be made in the form, construction, and arrangement of the components thereof without departing from the broad scope of the present disclosure or without sacrificing all of their material advantages. The form herein before described being merely an explanatory embodiment thereof, it is the intention of the following claims to encompass and include such changes.

The above description is intended to be illustrative, and not restrictive. For example, the above-described embodiments (or one or more aspects thereof) may be used in combination with each other. Other embodiments will be apparent to those of skill in the art upon reviewing the above description. In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document supersedes the usage in any incorporated references.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense. The scope of the claims should be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims.

What is claimed is:

1. A system for wireless communications with Gaussian frequency-shift keying (GFSK), the system comprising:
    a signal generator configured to generate training bit sequences;
    a pulse shaping element configured to generate shaped signals from the training bit sequences and a modulation index value;
    a baseband transmitter configured to generate transmission signals from the shaped signals;
    a frequency deviation estimator configured to determine frequency deviations of the transmission signals; and
    a modulation index value estimator configured at least to:
        in a first iteration, determine a first updated modulation index value based on a first frequency deviation, update the modulation index value used by the pulse shaping element, and calculate a first ratio of the modulation index value to the first updated modulation index value; and
        in a second iteration, determine a second updated modulation index value based on a second frequency deviation, update the modulation index value used by the pulse shaping element, and calculate a second ratio of the modulation index value to the second updated modulation index value.

2. The system of claim 1, further comprising a radio frequency core configured to receive the transmission signals and to loop back the transmission signals to the frequency deviation estimator.

3. The system of claim 1, wherein the first ratio and the second ratio are used as scaling factors by the pulse shaping element.

4. The system of claim 1, wherein the modulation index value estimator is further configured to calculate an average frequency deviation based on the first frequency deviation and the second frequency deviation.

5. The system of claim 1, wherein the training bit sequences are generated with increasing lengths in successive calibration operations.

6. The system of claim 1, wherein the modulation index value estimator is configured to perform the first iteration and the second iteration periodically to correct drift over time.

7. The system of claim 1, wherein the modulation index value estimator is configured to perform the first iteration and the second iteration when temperature change is detected by the system.

8. The system of claim 1, wherein the modulation index value estimator is configured to perform the first iteration and the second iteration when aberrant signals are received by the system.

9. The system of claim 1, wherein the modulation index value estimator is configured to perform the first iteration and the second iteration at start-up of the system.

10. A method for modulation index calibration in a wireless communication system with Gaussian frequency-shift keying (GFSK), the method comprising:
    generating training bit sequences;
    generating shaped signals from the training bit sequences and a modulation index value;
    generating transmission signals from the shaped signals;
    determining frequency deviations of the transmission signals;
    in a first iteration, determining a first updated modulation index value based on a first frequency deviation, updating the modulation index value, and calculating a first ratio of the modulation index value to the first updated modulation index value; and
    in a second iteration, determining a second updated modulation index value based on a second frequency deviation, updating the modulation index value, and calculating a second ratio of the modulation index value to the second updated modulation index value.

11. The method of claim 10, further comprising looping back the transmission signals through a radio frequency core.

12. The method of claim 10, wherein generating the shaped signals comprises using the first ratio and the second ratio as scaling factors.

13. The method of claim 10, further comprising calculating an average frequency deviation based on the first frequency deviation and the second frequency deviation.

14. The method of claim 10, wherein generating the training bit sequences comprises generating the training bits sequences with increasing lengths in successive calibration operations.

15. The method of claim 10, wherein the first iteration and the second iteration are performed periodically to correct drift over time.

16. The method of claim 10, wherein the first iteration and the second iteration are performed when temperature change is detected by the wireless communication system.

17. The method of claim 10, wherein the first iteration and the second iteration are performed when aberrant signals are received by the wireless communication system.

18. The method of claim 10, wherein the first iteration and the second iteration are performed at start-up of the wireless communication system.

* * * * *